United States Patent
Raskin et al.

(10) Patent No.: US 12,542,751 B2
(45) Date of Patent: Feb. 3, 2026

(54) SYSTEMS AND METHODS FOR PROVIDING REAL-TIME, INTERACTIVE EMAIL CONTENT

(71) Applicant: Selligent, S.A., Braine-l'Alleud (BE)

(72) Inventors: Pieter Raskin, Braine-l'Alleud (BE); Alexei Kounine, Braine-l'Alleud (BE); Christopher Burger, Braine-l'Alleud (BE); Erwin Cuppens, Braine-l'Alleud (BE)

(73) Assignee: Selligent, S.A., Braine l'Alleud (BE)

( * ) Notice: Subject to any disclaimer, the term of this patent is extended or adjusted under 35 U.S.C. 154(b) by 539 days.

(21) Appl. No.: 16/827,046

(22) Filed: Mar. 23, 2020

(65) Prior Publication Data

US 2020/0344188 A1    Oct. 29, 2020

Related U.S. Application Data

(60) Provisional application No. 62/838,072, filed on Apr. 24, 2019.

(51) Int. Cl.
*G06F 3/0486* (2013.01)
*G06F 3/04817* (2022.01)
(Continued)

(52) U.S. Cl.
CPC .......... *H04L 51/04* (2013.01); *G06F 3/04817* (2013.01); *G06F 3/04847* (2013.01); *G06F 3/0486* (2013.01); *H04L 51/10* (2013.01)

(58) Field of Classification Search
CPC ....... H04L 51/04; H04L 51/10; G06F 3/0486; G06F 3/04847; G06F 3/04817;
(Continued)

(56) References Cited

U.S. PATENT DOCUMENTS 9,001,055 B2 *  4/2015  Bamford ............... G06F 3/0486
                                              345/173
2004/0183830 A1 *  9/2004  Cody ................... G06Q 10/107
                                              715/747
(Continued)

OTHER PUBLICATIONS

PCT/EP2020/058365, International Search Report (PCT/ISA/210 and PCT/ISA/220) dated Jul. 10, 2020, enclosing Written Opinion of the International Searching Authority (PCT/ISA/237) (Thirteen (13) pages).

*Primary Examiner* — Jeanette J Parker
(74) *Attorney, Agent, or Firm* — Schwegman Lundberg & Woessner, P.A.

(57) ABSTRACT

A system for generating recipient-targeted electronic messages includes an electronic message generation module and a user interface that allows a user to interact with the electronic message generation module to generate the electronic messages. The electronic messages may include a live content element, which provides content to the electronic message that is determined by detected circumstances of the electronic message being opened. The electronic messages may include a smart content element, which provides content to the electronic message that is determined by a record of community activity. The electronic messages may include a kinetic content element, which provides content to the electronic message that is interactive to the recipient of the electronic message.

23 Claims, 10 Drawing Sheets

(51) Int. Cl.
*G06F 3/04847* (2022.01)
*H04L 51/04* (2022.01)
*H04L 51/10* (2022.01)

(58) Field of Classification Search
CPC .... G06F 3/0484; G06F 3/0483; G06F 3/0481; G06F 3/048; G06Q 30/02; G06Q 10/107
See application file for complete search history.

(56) References Cited

U.S. PATENT DOCUMENTS

| | | | |
|---|---|---|---|
| 2007/0220425 A1* | 9/2007 | Matulic | G06Q 10/107 715/234 |
| 2007/0266093 A1* | 11/2007 | Forstall | G06F 9/451 715/764 |
| 2010/0114790 A1* | 5/2010 | Strimling | G06Q 10/083 705/330 |
| 2011/0179362 A1 | 7/2011 | Craddock et al. | |
| 2011/0252103 A1* | 10/2011 | Beyer | H04L 51/34 709/206 |
| 2011/0289428 A1 | 11/2011 | Yuen et al. | |
| 2012/0042025 A1* | 2/2012 | Jamison | G06Q 10/107 709/206 |
| 2014/0288990 A1* | 9/2014 | Moore | G06Q 10/10 705/7.19 |
| 2014/0344735 A1* | 11/2014 | Wang | G06F 3/0486 715/765 |
| 2014/0365555 A1* | 12/2014 | Jwalanna | G06Q 10/00 709/203 |
| 2015/0121305 A1* | 4/2015 | Saund | G06Q 10/107 715/810 |
| 2017/0140415 A1 | 5/2017 | Jamison et al. | |
| 2017/0147308 A1 | 5/2017 | Wang et al. | |
| 2019/0097956 A1 | 3/2019 | Ciancio-Bunch et al. | |

* cited by examiner

FIG. 3F

Select a Live Content — X

Save  Save & Close  Connect  Close

Name* include link

CONFIGURATION  DATASOURCE SELECTION  LINK FIELDS  PREVIEW

Data Source*
Select existing or create new  [v][+][✎]

Name*
cdfsd

Type*
JSON [v]

URI*

Caching*
None [v]

Authentication
None [v] [Configure]

[Test Request]

[Save] [Cancel]

Description

① One or more configuration errors occurred
• Data Source Configuration is required

[Cancel]

340

346

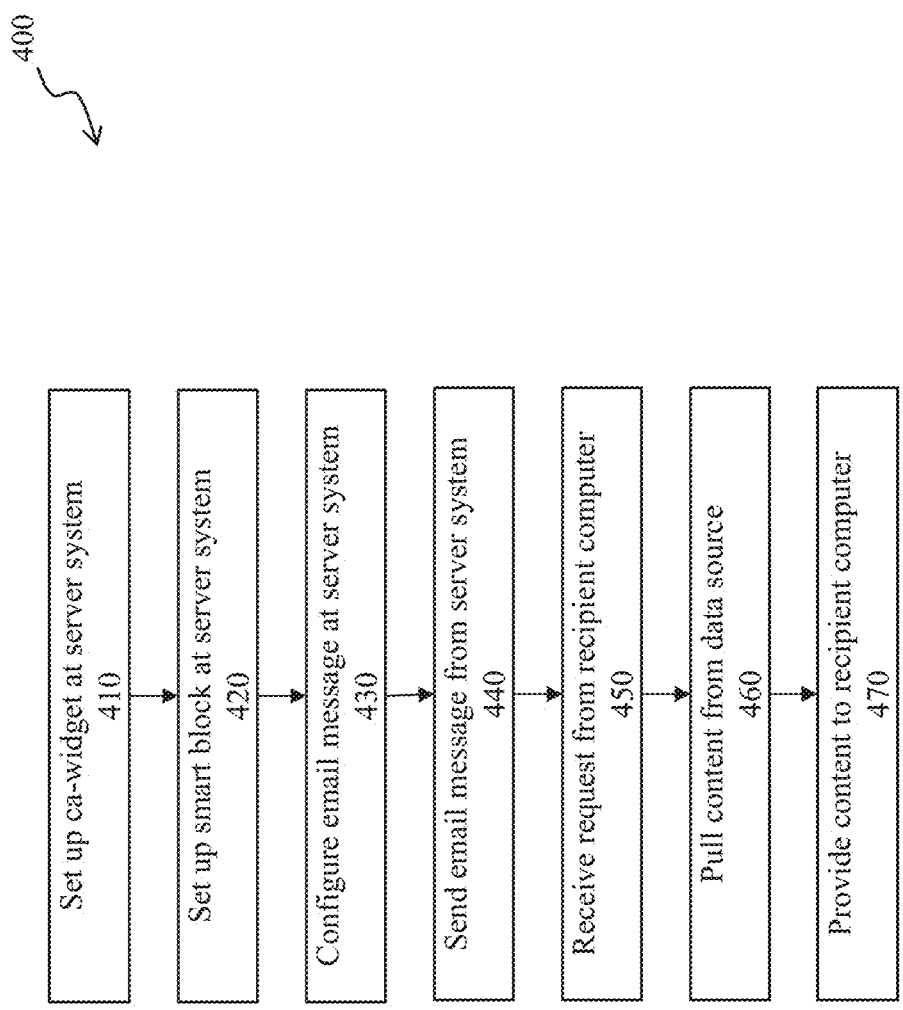

SYSTEMS AND METHODS FOR PROVIDING REAL-TIME, INTERACTIVE EMAIL CONTENT

CROSS-REFERENCE TO RELATED APPLICATIONS

This application claims the benefit of U.S. Provisional Application No. 62/838,072, filed Apr. 24, 2019, the contents of which are incorporated herein by reference in its entirety.

FIELD OF THE INVENTION

The present invention relates to computer and internet technology, namely, systems and methods for providing real-time, interactive email content.

BACKGROUND OF THE INVENTION

Targeted email content distribution refers to the technology of personalizing email content to a particular recipient user. It is often utilized to create personalized, highly relevant emails based on user profiles.

Targeted email content distribution is a technology based on the idea that the same email content will not resonate with everyone at every time, and that this non-homogeneity may have far reaching consequences affecting that resonance. For example, it makes little sense to provide geographically localized email content to users located elsewhere. As another example, it makes little sense to send an advertisement email to a user who is unlikely to purchase the advertised product. Therefore, especially where the email includes advertising content, the content of distributed emails is determined so as to increase the relevance of the content to the recipient.

Such efforts currently include predetermining the email content at or before the time of sending the email. In practice, such predetermination may be generic, or may be customized based on user information, such as user profiles, etc., and/or product information available at the time the email is generated. A problem with predetermining email content, however, is that the content may be outdated or not optimal by the time the recipient opens the email.

Another problem with current approaches to targeted email content distribution is that the message content is typically static and not interactive. This is in contrast to online content delivered via websites, which tend to utilize highly interactive elements that are more likely to resonate with visitors. However, such interactivity is not easily applied to emails en masse, and the difficulty increases as those emails are customized to particular recipients. This makes generating such emails problematic for targeted email marketing campaigns.

SUMMARY OF THE INVENTION

Systems and methods for providing real-time, interactive email content are disclosed herein, which overcomes the above-noted and other shortcomings of the prior art. In particular, the systems and methods disclosed herein provide emails having message content that is interactive and highly relevant to the recipient.

The objects, advantages and novel features of the present invention will become apparent from the following detailed description of one or more preferred embodiments when considered in conjunction with the accompanying drawings. It should be recognized that the one or more examples in the disclosure are non-limiting examples and that the present invention is intended to encompass variations and equivalents of these examples.

BRIEF DESCRIPTION OF THE DRAWINGS

The features, objects, and advantages of the present invention will become more apparent from the detailed description, set forth below, when taken in conjunction with the drawings, in which like reference characters identify elements correspondingly throughout.

FIGS. 3A-3G schematically illustrate exemplary graphical user interfaces in accordance with at least one aspect of the invention.

FIG. 4 illustrates an exemplary method for providing email message content in accordance with at least one aspect of the invention.

DETAILED DESCRIPTION OF THE PREFERRED EMBODIMENTS

Figure 1:
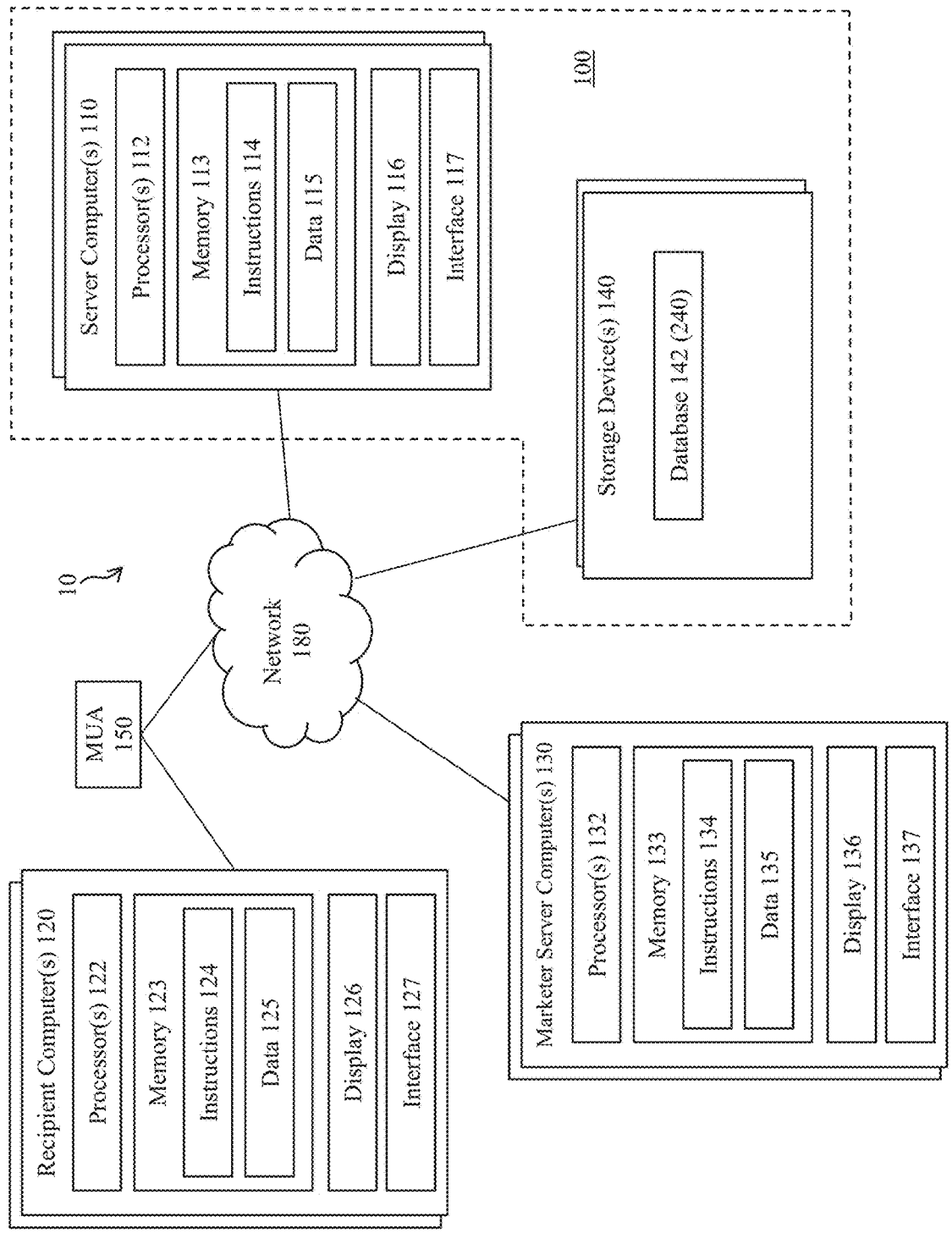
FIG. 1 illustrates a email content providing system in accordance with at least one aspect of the invention.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated.

In accordance with the practices of persons skilled in the art, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, code segments perform certain tasks described herein. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the following detailed description and corresponding figures, numerous specific details are set forth in order to provide a thorough understanding of the present invention. However, it should be appreciated that the invention may be practiced without such specific details. Additionally, well-known methods, procedures, components, and circuits have not been described in detail.

The present invention generally relates to systems and methods for providing personalized electronic message content.

FIG. 1 illustrates an exemplary email content providing system 10 in accordance with one or more aspects of the invention. In general, the system 10 provides email messages with content that may be live content, smart content and/or kinetic content—and is therefore more relevant and personalized to each recipient. It will be understood that, while the system 10 is described herein with reference to email messages, the principles of the invention are applicable to other types of electronic messages, e.g., in-app messages, website landing pages, etc.

The term "live content" refers to content that is based on when, where and how the email is opened, i.e., content with "live" features. For example, the content may be a promotion for summer dresses when it is sunny at the time and location the email is opened. The term "smart content" refers to content that is based on user activity, i.e., content with "smart" features. For example, the content may be a promotion for winter coats that are trending in popularity among users. The term "kinetic content" refers to content that is interactive, e.g., by clicking, scrolling, swiping, tapping, etc., through the application of one or more kinetic functions, i.e., content with kinetic features. For example, the content may be a carousel promotion, whereby additional portions of the promotion may be viewable by swiping the content area.

The system 10 generally comprises a server system 100 coupled to one or more recipient computers 120, via one or more message clients 150, a marketer server computer 130, and a storage device 140, via a public network 180 (e.g., the Internet).

The server system 100 many include one or more server computer(s) 110 connected to the network. Each server computer 110 may include computer components, including one or more processors 112, memories 113, displays 116 and interfaces 117, and may also include software instructions 114 and data 115 for executing the functions of the server system 110 described herein.

The recipient computers 120 are user computing devices, which may include mobile (e.g., laptop computers, tablet computers, smartphones, PDAs, wearables, etc.) and stationary (e.g., desktop computers, etc.) devices connected to the network 180 and configured to send and receive email messages. Each recipient computer 120 may include computer components, such as one or more processors 122, memories 123, displays 126 and interfaces 127, and may also include software instructions 124 and data 125 for executing the functions of the recipient computer(s) 120 described herein.

The marketer server computer(s) 130 may similarly include computer components, such as one or more processors 132, memories 133, displays 136 and interfaces 137, and may also include software instructions 134 and data 135 for executing the functions of the marketer server computer(s) 130 described herein. Marketer server computers may, for example, be part of a marketer server system that supports marketer websites, product databases and other sources of content. The marketer server system may also provide application programming interfaces (APIs) and other software components that permit supported content to be pulled from its source within the marketer server system.

The processor(s) 112, 122, 132 may instruct the respective computer components to perform various tasks based on the processing of information and/or data that may have been previously stored or have been received, such as software instructions and/or data stored in the memory(s) 113, 123, 133. The processor(s) 112, 122, 132 may be standard processor(s), such as a central processing unit (CPU), or may be dedicated processor(s), such as an application-specific integrated circuit (ASIC) or a field programmable gate array (FPGA), or a graphical processing unit (GPU).

The memory(s) 113, 123, 133 may store at least software instructions 114, 124, 134 and/or data 115, 125, 135 that can be accessed by the processor(s) 112, 122, 132. For example, the memory(s) 113, 123, 133 may be hardware capable of storing information accessible by the processor(s) 112, 122, 132, such as a ROM, RAM, hard-drive, CD-ROM, DVD, write-capable, read-only, etc. The set of instructions 114, 124, 134 may be included in software that can be implemented on the computer(s). It should be noted that the terms "instructions," "steps," "algorithm," and "programs" may be used interchangeably. The data 115, 125, 135 can be retrieved, manipulated or stored by the processor(s) 112, 122, 132 in accordance with the software instructions 114, 124, 134 or other sets of executable instructions. The data 115, 125, 135 may be stored as a collection of data.

Accordingly, the computer(s) 110, 120, 130 may include one or more respective software applications, stored in respective memory(s) 113, 123, 133, which software applications, when executed by the processor(s) 112, 122, 132 configures the computer(s) 110, 120, 130 to function as described herein. In particular, the recipient computing device(s) 120 may be configured to receive, view and/or otherwise access email messages (and content included therein) provided by the server computer(s) 110, and to send and/or receive data to and from the server computer(s) 110.

The respective display(s) 116, 126, 136 may be any type of device capable of visually communicating data, such as a liquid-crystal display ("LCD") screen, a plasma screen, etc. The respective interface(s) 117, 127, 137 allow users to communicate with the computer(s) and may be a physical device (e.g., a port, a keyboard, a mouse, a touch-sensitive screen, microphone, camera, a universal serial bus (USB), CD/DVD drive, zip drive, card reader, etc.) and/or may be virtual (e.g., a graphical user interface "GUI," etc.).

The server computer(s) 110 may be rack mounted on a network equipment rack and/or located, for instance, in a data center. In one example, the server computer(s) 110 may use the network 180 to serve the requests of programs executed on the recipient computing devices 120, marketer server computers 130, the storage device 140 and/or other server computer(s) 110.

The storage device 140 may be configured to store large quantities of data and/or information, and may include one or more databases 142. For example, the storage device may be a collection of storage components, or a mixed collection of storage components, such as ROM, RAM, hard-drives, solid-state drives, removable drives, network storage, virtual memory, cache, registers, etc. The storage device 140 may also be configured so that the server computer(s) 110 may access it via the network 180.

The message client 150 may be any hardware and/or software configured to provide message management, composition and reception functions, independently or in connection with a message server (not shown). The message client 150 may be, for example, an email client or mail user agent ("MUA") providing said functionality in connection with an email server or mail transfer agent ("MTU").

The network 180 may be any type of network, wired or wireless, configured to facilitate the communication and transmission of data, instructions, etc. from one component to another component of the network. For example, the network 180 may be a local area network (LAN) (e.g., Ethernet or other IEEE 802.03 LAN technologies), Wi-Fi (e.g., IEEE 802.11 standards, wide area network (WAN), virtual private network (VPN), global area network (GAN)), any combination thereof, or any other type of network.

It is to be understood that the configuration illustrated in FIG. 1 serves only as an example and is thus not limited thereto. The system 10, for instance, may include numerous other components, or more than one of each component, connected to network 180, and the network may be connected to other networks. As discussed, the system 10 may be implemented via computer executed software. As such, the various functionalities of the system may be understood in terms of computer executed software modules in accordance with a system architecture.

Figure 2:
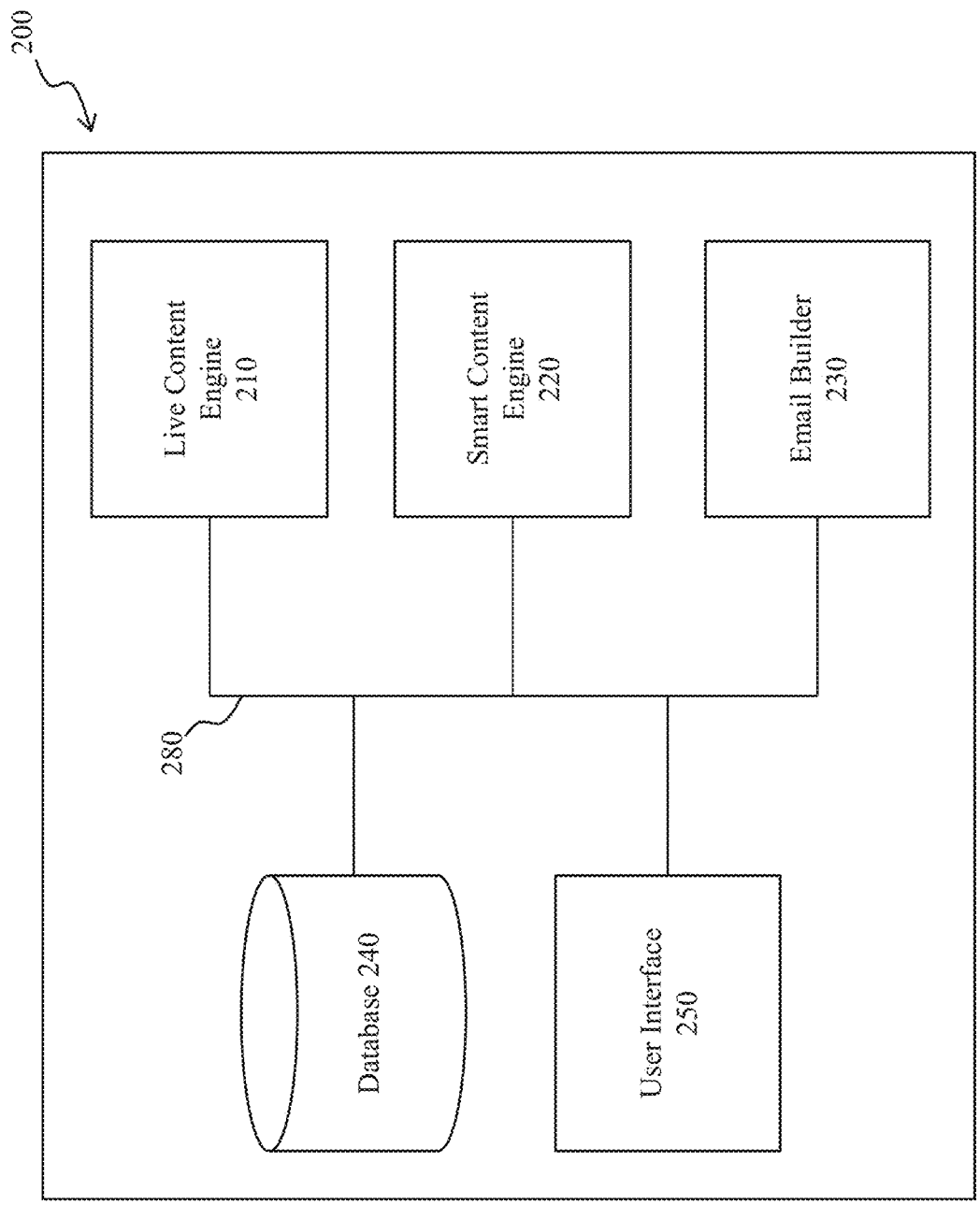
FIG. 2 illustrates an exemplary system architecture for providing email message content in accordance with at least one aspect of the invention.

FIG. 2 illustrates an exemplary system architecture 200 for providing email message content in accordance with at least one aspect of the invention. In general, the system architecture 200 is embodied in the server system 100 and provides for email messages with message content that may include live content, smart content and/or kinetic content. The system architecture 200 may include several functional modules or engines, including: a live content engine 210, a smart content engine 220, an email builder 230, a database 240, and a user interface 250, operatively coupled via an internal network 280.

The user interface 250 is configured to allow a user of the system, via a user computer (not shown), to interact with the system so as to configure an email message having message content that includes live content, smart content and/or kinetic content. In some embodiments, the email message may be sent to a plurality of recipients as part of a message campaign—and the message content of the email message may vary among recipients.

The live content engine 210 is configured to create content automation widgets (ca-widget). A ca-widget is a software widget that may be included within an email, such that, at the time the email is opened, that allows the email to utilize an associated application programming interface (API) to pull content from a data source (e.g., a source website) and display it in the email. The live content engine 210 associates ca-widgets with APIs that pull desired content from identified data sources. In particular, the live content engine 210 configures the data source for each ca-widget and maps fields returned by the associated API to a widget template selected from a database 240. The user may interact with the ca-widget, or live content, via a user interface, in the form of a live block displayed in a draft email, as discussed herein.

In general, the ca-widgets may be html-documents having adjustable parameters, the adjustment of which alters the rendered outcome of the html-document in the email. For example, a weather forecast widget may include parameters for: temperature, location and forecast period, such that the weather forecast widget, renders the temperature at the location over the forecast period. Some exemplary types of widgets include: a dynamic image widget, which overlays a static image with dynamic text; a web scrape widget, which creates a snapshot of a specific area of a website; a current weather widget, which renders the current weather at the location; a countdown timer widget; a content automation widget, which automatically pulls content from the data source; a nearest store widget, which identifies the nearest store to the location; a social media widget, which shows the latest social media post meeting certain criteria (e.g., latest post, like, share, comment, etc.).

In operation, the user, via the user interface 250, selects the widget template from a plurality of widget templates stored in the database 240. It will be understood that the widget template may be a new widget template created by the user. After selection of the widget template, the user may configure the ca-widget with characteristics of the data source. This may include configuring the uniform resource identifier for the associated API (API-uri), as well as authentication properties, credentials, security, etc., as is known in the art. For example, the widget may be configured to pull item availability and pricing information from the datasource. The configured ca-widget is then saved in the database 240.

The content pulled in accordance with the ca-widget may be live content, as it is not pulled from the data source until the email is opened. As such, it may be a real-time representation of the pulled content, e.g., an item availability, pricing, image, etc. This is also referred to herein as a live content component.

The smart content engine 220 is configured to create smart blocks 222, which provide smart content from the data store. The smart content may be determined based on product and user related data to predict the most relevant content for each recipient. However, it will be understood that the smart content may be default content, for example, in the event there is no more relevant content.

Exemplary approaches to smart content are discussed in U.S. application Ser. No. 16/261,426, filed on Jan. 29, 2019, which is hereby incorporated by reference in its entirety.

The smart content may be determined by one or more predictive algorithms, which utilize product and user related data to predict the most relevant content for each recipient. The predictive algorithms may be stored in the database 240, and may be selected by the user in accordance with business goals. The predictive algorithms may, for example, optimize those business goals (e.g., conversion, discovery, promoting popular items, etc.). In this sense, the relevance of the content is its relevance in achieving the particular business goal: content is more relevant where it is predicted to be more likely to achieve the business goal than other content.

The smart content may further be limited by the application of one or more filters, which filter predicted relevant content identified by the application of the predictive algorithms. The one or more filters may, for example, define the content of the message campaign by the characteristics of the content, e.g., category/categories of products.

In operation, the user, via the user interface 250, selects a predictive algorithm from a plurality of predictive algorithms stored in the database 240. The user then selects one or more filters from a plurality of filters stored in the database 240 to be applied to the algorithm by the smart content engine 220. The smart content engine 220 may therefore be configured to retrieve selected predictive algorithms and filters from the database 240, and to apply them in the creation of the smart blocks 222. The smart block 222 may be retrievably saved to the database 240.

The smart content engine 220 may also be configured to associate smart blocks 222 with ca-widgets, thereby imparting live content functionality to the smart blocks 222. In operation, the user, via the user interface 250, may select one or more ca-widgets to be associated with the smart block 222. The smart content engine 220 associates the ca-widget with the smart block 222 such that, when executed within the email, the message content includes both smart and live content features. For example, the message content may be an image of item X pulled from the data source at the time the message is opened by the recipient, via the live content functionality, and determined, via the smart content functionality, to likely resonate with the recipient at the time of the message opening. The smart block 222 may be retrievably saved to the database 240.

It will be understood that the smart block 222 is configured such that, when an email containing the smart block 222 therein is opened at the recipient computer 120, the smart block 222 sends a request to the server system 100, via the network 180, for the associated content components, e.g., live content components. The server system 100 then pulls the content from the data source—which content is then used to generate the associated content components. The pulling of content is preferably via an API call in accordance with the API configurations of the smart block 222. The generated content components are then provided by the server system 100 to the recipient computer 120 such that the message content of the opened email is populated with the associated content components.

The email builder 230 may be configured to build email messages so as to incorporate the created smart blocks 222 therein. The email builder 230 may also be configured to associate one or more kinetic functions 332 with the incorporated smart blocks 222.

In operation, the user, via the user interface 250, opens a draft email from the database 240, which draft email may correspond to a new email or a pre-existing email that has been saved for the later addition of smart, live and/or kinetic content and/or features.

Kinetic content may be implemented via software that allows the email recipient to meaningfully interact with the message content (e.g., the smart block or its content) in some way, e.g., by clicking, scrolling, swiping, tapping, etc. In particular, a kinetic component may be built from html and css rules that impart specific kinetic content functionalities to identified content. For example, the kinetic content may include a carousel function, whereby additional content may be viewable by swiping, or by clicking on a "next" button. As another example, the kinetic content may include hyperlinking the message content to an associated website, e.g., an online store where the recipient may purchase the item promoted via the smart block 222. Additional kinetic content may include, for example, accordion, gallery, tab and any other kinetic functionality known in web design. Indeed, an aspect of the invention is to incorporate web design kinetic functionality in emails, preferably in association with smart and/or live content. The user may interact with the kinetic content, or kinetic functionality, via the user interface, in the form of a kinetic block, as discussed herein.

In one embodiment, the user uses the email builder 230 to incorporate the smart block 222 into the draft email 312. Using the user interface 250, the user may, for example, select the desired smart block 222 from among a plurality of smart blocks saved to the database 240. The selected smart block 222 may then be applied to a desired location in the email message.

The user may also select one or more kinetic functions to apply to the smart block 222, e.g., adding a hyperlink to the content shown by the smart block or rendering the content of the smart block 222 as a content carousel. Using the user interface 250, the user may, for example, select the desired kinetic content from among a plurality kinetic content saved to the database 240. The user may, for example select the kinetic content via, e.g., a check indicator associated with the smart box 222. The selected kinetic content may thereby be applied to the smart block 222.

Alternatively, in at least some embodiments, where the user declines to select kinetic content to be applied to the smart block 222, the content of the smart block 222 may be shown without the kinetic features. For example, for smart blocks pulling a plurality of images as content, those images may be shown side-by-side rather than in accordance with the kinetic carousel feature, which remains unselected. The user may also use the email builder 230 to associate individual content items with the kinetic component, independent of any smart block.

The smart blocks 222 may also be configured so as to render a default state, in which one or more of the smart or the kinetic features are not rendered. The default state may be rendered when, for example, such features are not supported by the message client 150. For example, a smart block may be configured to render the content of a twitter feed, and, where supported, may render that content dynamically so that it changes in real time with the actual twitter feed whose content it is rendering (i.e., via the real-time kinetic function option). But, where such dynamic features are not supported by the message client 150, the smart block may default to rendering the static content of the twitter feed at the time the email was opened.

Figure 3A:
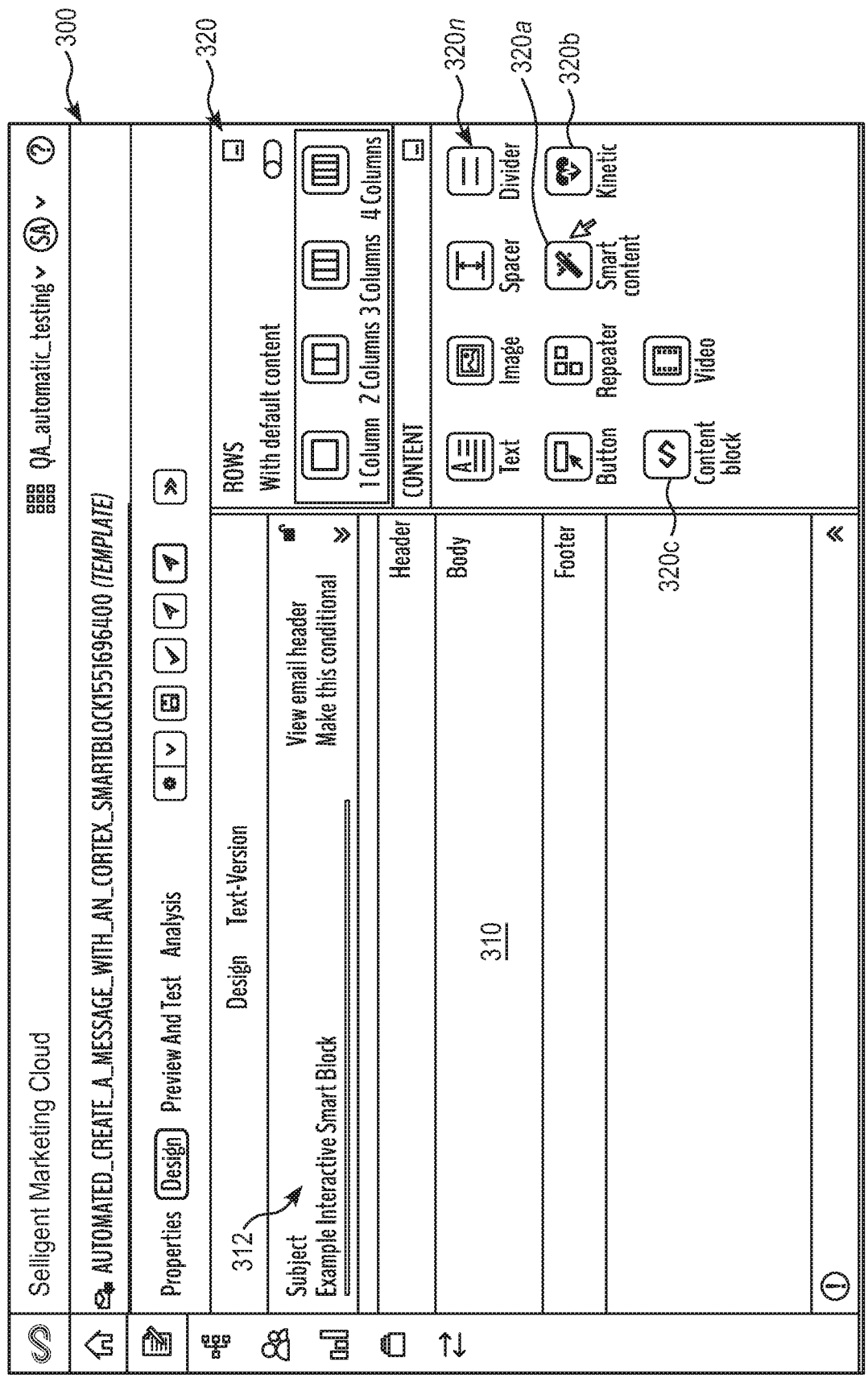
Figure 3B:
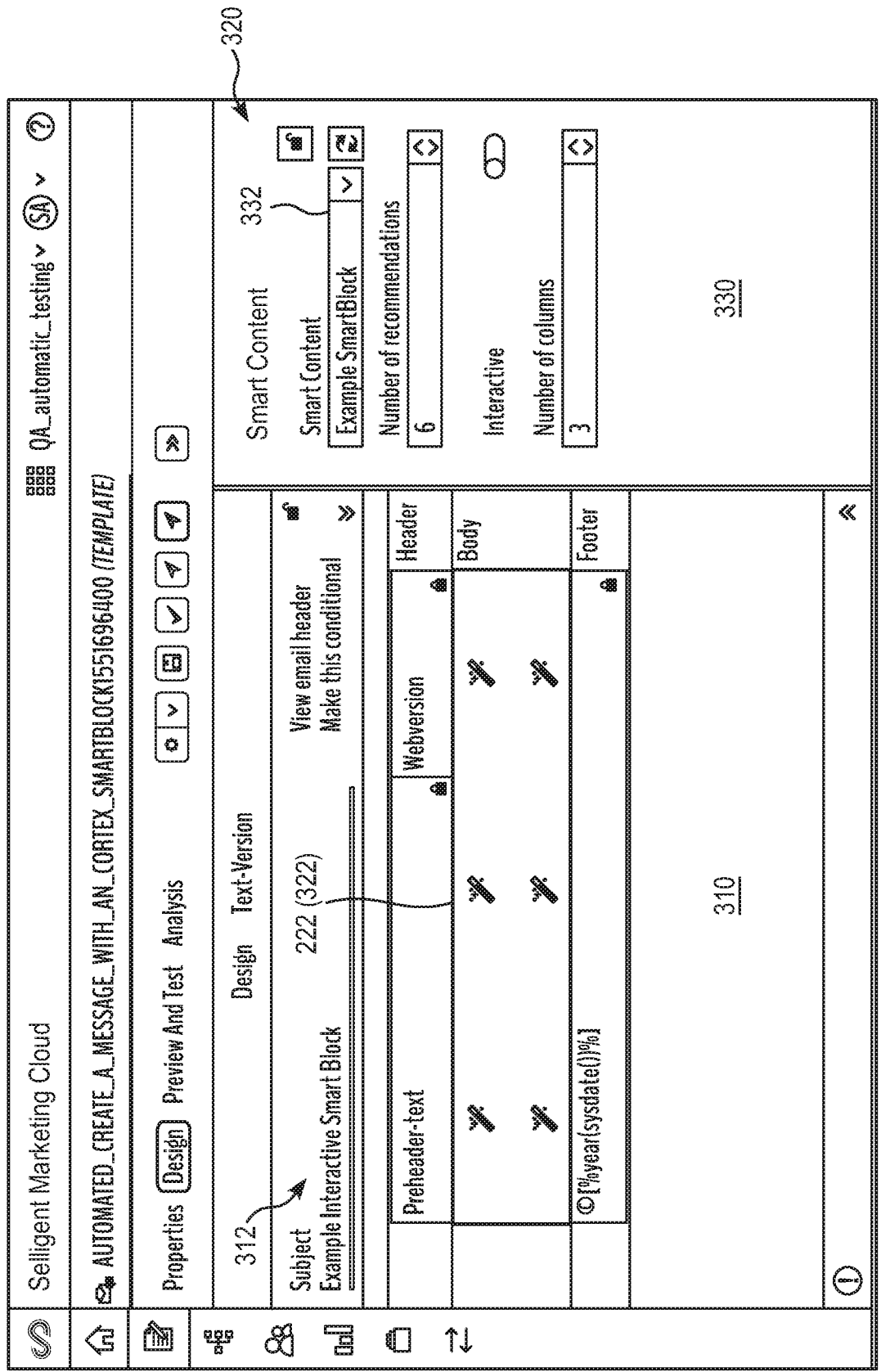
Figure 3C:
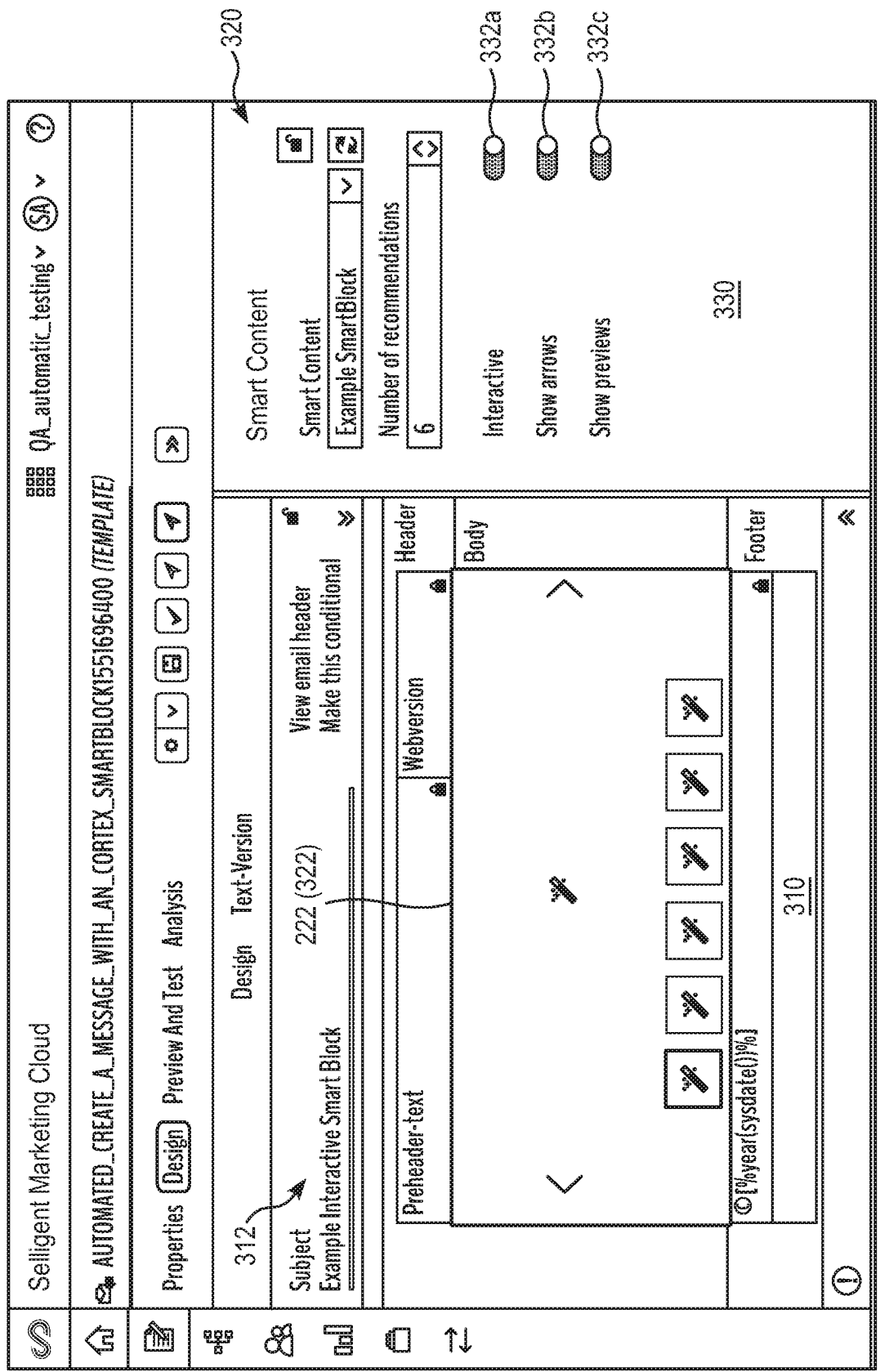

FIGS. 3A-3C schematically illustrate an exemplary graphical user interface 300 in accordance with at least one aspect of the invention. In general, the graphical user interface 300 permits the user to configure the message content of the draft email 312 via the application of message components within the draft email 312 to form the message content.

The graphical user interface 300 may include a message section 310 and a component panel 320. The message section 310 may reflect the content layout of the electronic message to be built by the email builder 230. The component pane 320 may include several component-type icons 320*n*. Each component-type icon 320*n* may correspond to a different type of component that may be added to the electronic message, including, for example: text, image, spacers, dividers, repeaters, smart content blocks, kinetic blocks, content blocks, and video components.

The graphical user interface 300 may permit the user to select a component-type to apply to the message section via, for example, a drag-and-drop operation performed with the corresponding icon 320*n*. The application of the component-type to the message section may cause a corresponding component block 322 to be visualized within the message section 310. The component block 322 may further be editable or customizable by the user. For example, the size and location of the component block 322 within the electronic message may be edited by the user via the graphical user interface.

The application of the component-type to the message section may cause a corresponding properties pane 330 to be visualized. The properties pane 330 may permit the user to select, e.g., via one or more dropdown lists or other entry fields, a specific component from the database. For example, a specific ca-widget of the type indicated by the content icon 320*c* may be selected from the database. A kinetic block may be provided to the draft email 312 or portions thereof via selection of a kinetic content icon 320*b*. The properties pane 330 may also permit the user to edit or customize one or more properties of the of the component block 322.

FIG. 3B illustrates the exemplary graphical user interface 300 after selection of the smart content icon 320*a*. As can be seen, the smart block 222 is visualized within the message section 310, having been accessed from the database. The corresponding properties pane 330 is also visualized. Within the properties pane 330, a dropdown list 332 permits the user to select a specific smart block 222 from the database. In the illustrated example, the selected smart block 222 is "Example SmartBlock."

The selected smart block 222 may also determine the availability of one or more customizable properties 332n. Moreover, the customization of these property may in turn make available or unavailable further customizable properties 332n. For example, an "interactive" toggle 332a may apply a kinetic content element, e.g., the kinetic carousel function, to the selected smart block 222, which may in turn permit further customization by allowing the user to select whether to "show arrows" 332b and "show previews" 332c, which can be seen in FIG. 3C.

It will be understood that component blocks 322 may be nested. For example, kinetic components, such as an accordion layout, may include nested components such as, e.g., a carousel in a first panel, a smart block in a second panel, a live content image in a third panel, and text, an image and a button in a fourth panel.

Figure 3D:
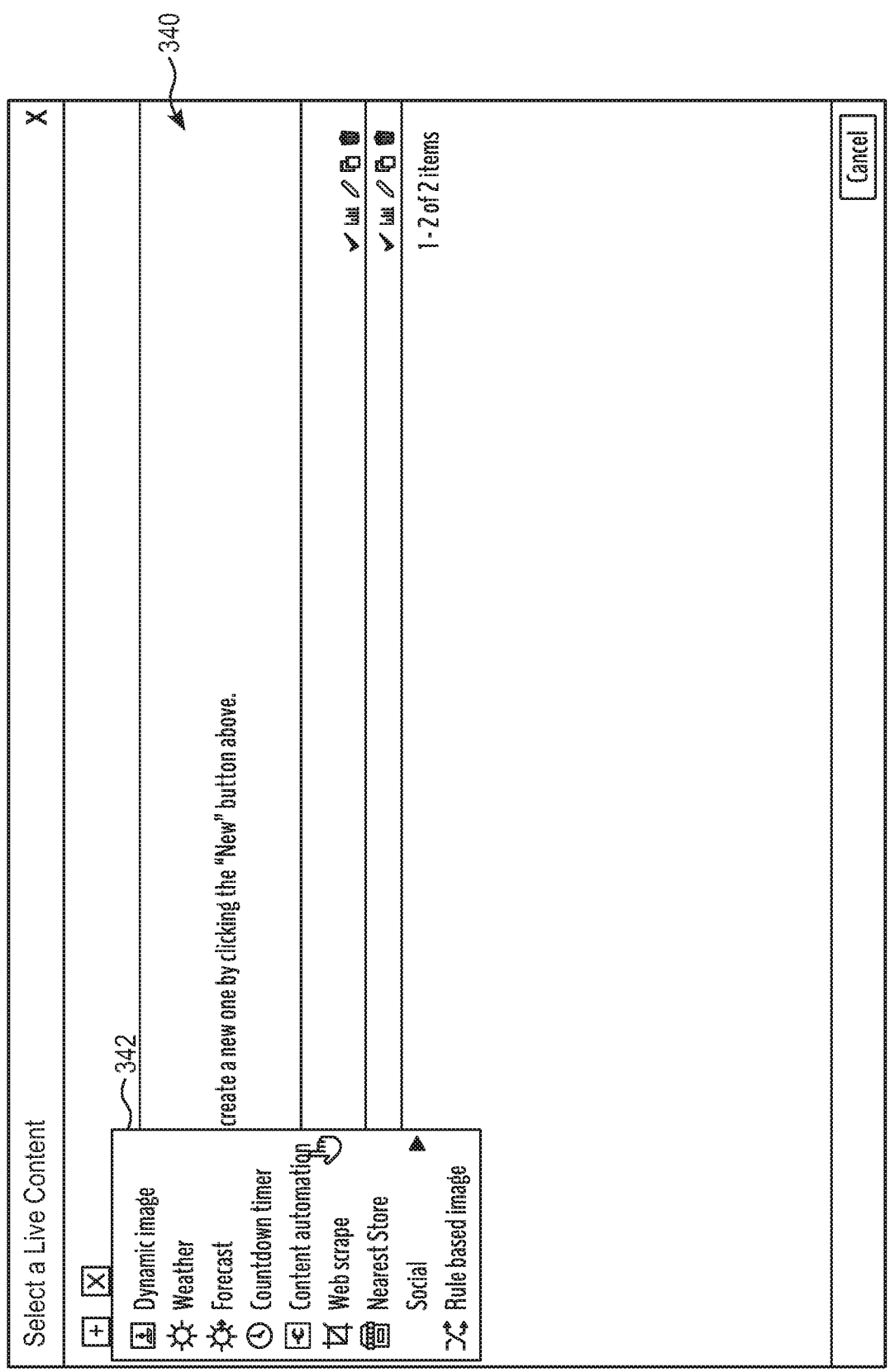

FIG. 3D illustrates the exemplary graphical user interface 300 after selection of the live content icon 320c. As can be seen, the selection of the live content icon 320c may cause the display of a live content configuration interface 340, via which the details of the live content may be customized by the user. The user may utilize a dropdown menu, or any other interface, to select a type of live content from among a plurality of potential types of live content. The various types of live content may include, for example: dynamic images, weather, forecast, countdown timer, content automation, web scrape, location, social media, and rule based images, each of which are known types of live content. A dynamic images type provides live images. A weather type provides live weather information. A forecast type provides a live forecast of weather, traffic or other forecastable circumstances. A countdown timer type provides a live countdown timer to an event. A content automation type provides live automated content. A web scrape type provides content retrieved via a live scraping of a website. A location type provides live location-based information, such as the nearest store. A social media type provides live social media posts. A rule based image type provides images based on the result of a live determination of rules.

Figure 3E:
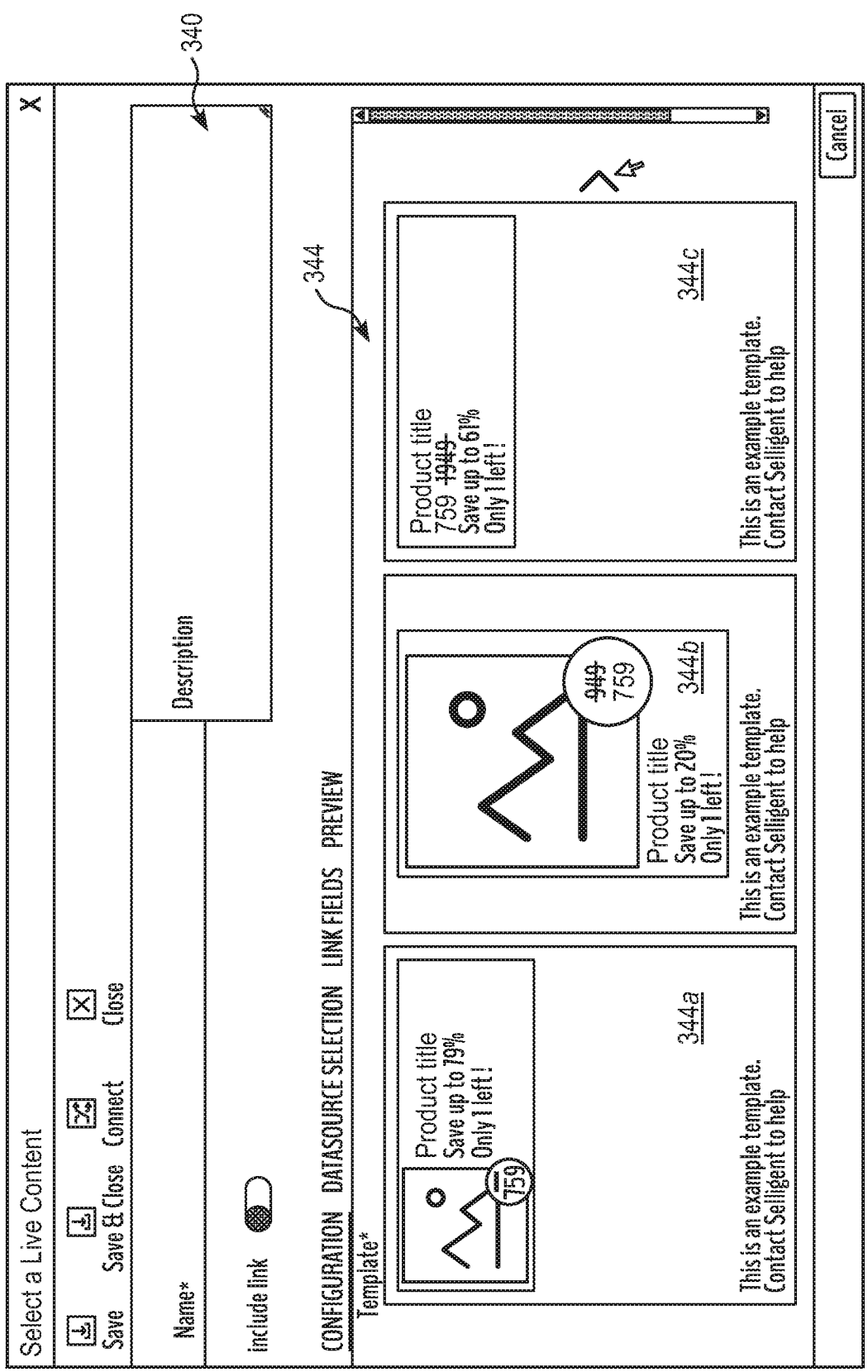

The selection of the live content type may further cause the display of a configuration panel 344 via which the live content block may be further configurable. An exemplary configuration panel 344 is shown in FIGS. 3E-F. As can be seen, the user interface may enable the user to select a layout for the live content from among a plurality of layout templates 344a-c. The configuration panel may also allow the user to select the data source 346 from which the live content is pulled via the corresponding API, as discussed herein, as well as otherwise configure the live content.

Figure 3G:
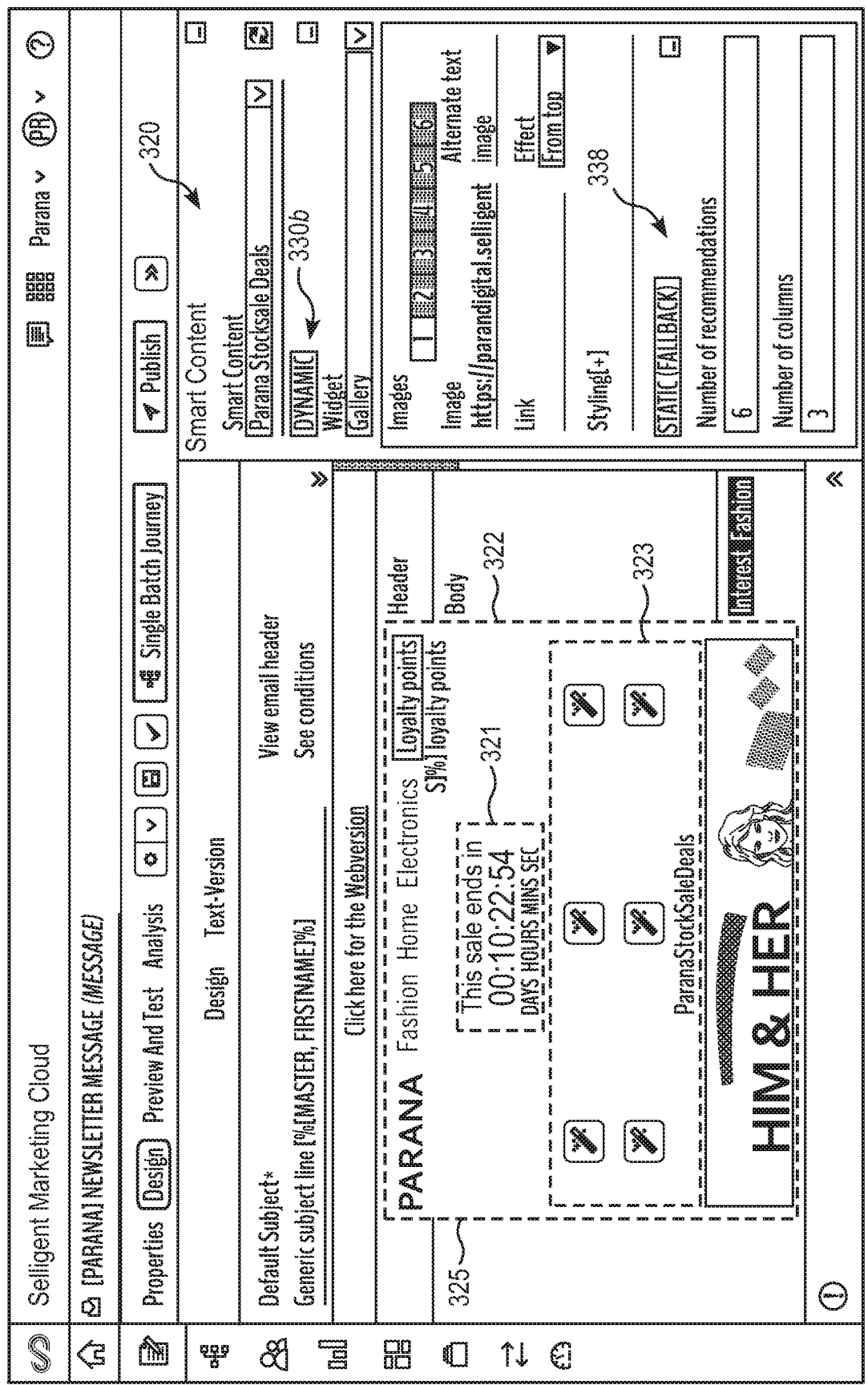

FIG. 3G schematically illustrate the exemplary graphical user interface 300 with a live block 321, a smart block 322, a kinetic block 323, and a text block 325. As also shown, the user may select a kinetic block 323 to be applied to the message section 310 in a similar manner as the smart block 222. The location of the kinetic block 323 within the message section 310 may be determined via a drag-and-drop operation, similar to the smart block 322. The properties pane 330b associated with the kinetic block 323 may also include options to associate the kinetic block with one or more smart blocks 222, or otherwise configure the kinetic block 323.

As also shown in FIG. 3G, the properties pane 330 may further provide a default state configuration pane 338 for configuring the default state, in which one or more of the smart and/or the kinetic features are not rendered. The default state may be rendered when, for example, such features are not supported by the message client 150. For example, a smart block may be configured to render the content of a twitter feed, and, where supported, may render that content dynamically so that it changes in real time with the actual twitter feed whose content it is rendering (i.e., via the real-time kinetic function option). But, where such dynamic features are not supported by the message client 150, the smart block may default to rendering the static content of the twitter feed at the time the email was opened.

FIG. 4 illustrates an exemplary method for providing email message content in accordance with at least one aspect of the invention.

In Step 410, the user, via the user interface 250, sets up the ca-widget. As discussed above, the user may select the widget template from a plurality of widget templates stored in the database 240. The user may further configure the ca-widget with characteristics of the data source, which configuration may include configuring the uniform resource identifier for the associated API (API-uri), as well as authentication properties, credentials, security, etc., as is known in the art. The user may further save the configured ca-widget in the database 240.

In Step 420, the user, via the user interface 250, sets up the smart block 222. As discussed above, the user may select a predictive algorithm from a plurality of predictive algorithms stored in the database 240. The user may further select one or more filters from a plurality of filters stored in the database 240. The algorithm and filters may further be applied to create the smart block 222. The user may further save the smart block 222 to the database 240.

In Step 430, the user, via the user interface 250, configures the email message. As discussed above, the user may open the draft email 312 from the database 240 within the email builder 230. The user may utilize the email builder 230 to incorporate one or more smart blocks 222 into the draft email 312.

The incorporation of smart blocks 222 into the draft email 312 may include, for example, selecting the desired smart block 222 from among a plurality of smart blocks 222, and dragging it to the desired location in the email message. Kinetic functions may be applied to the smart block 222 by selecting the desired kinetic functions from within the properties pane 330, as discussed above.

The incorporation of smart blocks 222 into the draft email 312 may further include first incorporating a kinetic component block into the draft email 312, which kinetic component block may be associated with one or more smart blocks 222. Using the user interface 250, the user may select the desired kinetic component block 332 to be associated with the one or more smart blocks, e.g., a carousel functionality, which kinetic component 332 may be applied at the desired location in the email message. Smart blocks 222 may be applied to the kinetic component block 332 from the smart block pane 320, via the dragging technique discussed above.

At Step 440, the server system 100 sends the email containing the smart block 222 (322) and kinetic component to the recipient computer via the network.

At Step 450, when the email containing the smart block is opened at the recipient computer 120, the smart block 222 sends a request to the server system 100, via the network 180, for the associated content components.

At Step 460, in response to receiving the request, the server system 100 pulls content from the data source—which content is then used to generate the associated content components.

At Step 470, the generated content components are provided by the server system 100 to the recipient computer 120 such that the message content of the opened email is populated with the associated content components.

In particular, the kinetic block corresponds to software instructions (e.g., css and html rules) to, for example, show a carousel list of images. Which images are shown is determined by operation of the smart blocks 222 associated with the kinetic block. When the recipient opens his/her electronic message, the smart content engine 220 receives an image request from the message client 150 of the recipient and determines, for example, which products the images will be of. The live content engine 210 then pulls live content associated with, e.g., the identified products, and generates the requested images, which are streamed to the message.

In this manner, the email message content providing system described herein provides message content that includes live, smart and kinetic content.

The embodiments described in detail above are considered novel over the prior art and are considered critical to the operation of at least one aspect of the described systems, methods and/or apparatuses, and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements.

Changes from the subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

The scope of this description is to be interpreted in conjunction with the appended claims.

What is claimed is:

1. A system for providing electronic messages with content, the system comprising:
    an electronic message generation module configured to:
        generate a recipient-targeted electronic message comprising a kinetic content element, which provides non-hyperlink content to the recipient-targeted electronic message that is interactive to a recipient of the recipient-targeted electronic message, and cause the electronic message to be distributed to the recipient; and
    a user interface configured to allow a user to interact with the electronic message generation module so that the user can thereby graphically:
        select and position the kinetic content element within the electronic message, via a drag-and-drop operation, wherein a position of the kinetic content element is identified by the drag-and-drop operation, and
        initiate distribution of the recipient-targeted electronic message to the recipient via the electronic message generation module.

2. The system of claim 1, wherein the recipient-targeted electronic message generated by the electronic message generation module further comprises at least one of:
    a live content element, which provides content to the recipient-targeted electronic message that is determined by detected circumstances of the recipient-targeted electronic message being opened, and
    a smart content element, which provides content to the recipient-targeted electronic message upon opening that is determined by a record of community activity.

3. The system of claim 2, further comprising a live content generation module configured to generate the live content element as a content automation widget that utilizes an application programing interface to pull content from a data source coupled to the system.

4. The system of claim 2, further comprising a smart content generation module configured to generate the smart content element as a smart block.

5. The system of claim 1, further comprising a kinetic content generation module configured to generate kinetic content as a kinetic function applied to content of the recipient-targeted electronic message.

6. The system of claim 2, further comprising a database storing at least one of live content elements, smart content elements, and kinetic content elements.

7. The system of claim 2, wherein the user interface comprises the recipient-targeted electronic message and a component pane via which the live content elements are selectable for inclusion in the electronic recipient-targeted message.

8. The system of claim 2, wherein the user interface supports drag-and-drop functionality via which an icon representing the content is includable in the recipient-targeted electronic message.

9. The system of claim 2, wherein the user interface comprises a properties pane via which properties of the at least one of a live content element, a smart content element, and a kinetic content element are adjustable.

10. A non-transitory storage medium comprising a computer program stored thereon, execution of the computer program by a computing device configuring the computing device to perform a method for providing electronic messages with content, the method comprising:
    establishing a data communication link with at least one remote server,
    generating, via the data communication link, an interactive user interface configured to allow a user to interact with an electronic message generation module so that the user can thereby graphically:
        select a kinetic content element, as a content element of a recipient-targeted electronic message, via a drag-and-drop operation, wherein the kinetic content element provides non-hyperlink content to the electronic message that is interactive to a recipient of the electronic message;
        position the kinetic content element within the electronic message, via the drag-and-drop operation, wherein the position of the kinetic content element is identified by the drag-and-drop operation, and
        initiate distribution of the electronic message to the recipient via the electronic message generation module.

11. The non-transitory storage medium of claim 10, wherein the user can graphically further select, via interaction with the electronic message generation module, at least one of:
    a live content element, which provides content to the electronic message that is determined by detected circumstances of the electronic message being opened, and
    a smart content element, which provides content to the electronic message upon opening that is determined by a record of community activity.

12. The non-transitory storage medium of claim 11, wherein the live content element comprises a content automation widget that utilizes an application programing interface to pull content from a data source coupled to a system.

13. The non-transitory storage medium of claim 11, wherein the graphical user interface is further configured to display the smart content element a user interactive smart block.

14. The non-transitory storage medium of claim 10, wherein the kinetic content comprises a kinetic function applied to content of the electronic message.

15. The non-transitory storage medium of claim 11, wherein the method further comprises pulling the content element from a database storing at least one of live content elements, smart content elements, and kinetic content elements.

16. The non-transitory storage medium of claim 11, wherein the user interface comprises the electronic message and a component pane via which the content elements are selectable for inclusion in the electronic message.

17. The non-transitory storage medium of claim 11, wherein the user interface supports drag-and-drop functionality via which an icon representing the content is includable in the electronic message.

18. The non-transitory storage medium of claim 11, wherein the user interface comprises a properties pane via which properties of the at least one of live content element, smart content element and kinetic content element are adjustable.

19. A system for providing electronic messages with content, the system comprising:
    an electronic message generation module configured to:
        generate a recipient-targeted electronic message comprising a kinetic content element applied to at least one of a live content element and a smart content element, wherein the live content element provides content to the recipient-targeted electronic message that is determined by detected circumstances of the recipient-targeted electronic message being opened, wherein the smart content element provides content to the recipient-targeted electronic message that is determined by a record of community activity, and wherein the kinetic content element provides interactivity to non-hyperlink content of the recipient-targeted electronic message so as to be interactive to a recipient of the recipient-targeted electronic message, and
        cause the recipient-targeted electronic message to be distributed to the recipient; and
    a user interface configured to allow a user to interact with the electronic message generation module so that the user can thereby graphically:
        select the kinetic content element via a drag-and-drop operation,
        position the kinetic content element within the recipient-targeted electronic message, via a drag-and-drop operation, wherein the position of the kinetic content element is identified by the drag-and-drop operation, and
        initiate distribution of the recipient-targeted electronic message to the recipient via the electronic message generation module.

20. A system for providing electronic messages with content, the system comprising:
    a processor configured to:
        generate a recipient-targeted electronic message comprising a kinetic content element, which provides non-hyperlink content to the recipient-targeted electronic message that is interactive to a recipient of the recipient-targeted electronic message, and cause the recipient-targeted electronic message to be distributed to the recipient; and
    a user interface configured to allow a user to interact with the processor so that the user can thereby graphically:
        select the kinetic content element via a drag-and-drop operation,
        position the kinetic content element within the recipient-targeted electronic message, via the drag-and-drop operation, wherein the position of the kinetic content element is identified by the drag-and-drop operation, and
        initiate distribution of the recipient-targeted electronic message to the recipient via the processor.

21. The system of claim 20, wherein the recipient-targeted electronic message further comprises a live content element, which provides content to the electronic message that is determined by detected circumstances of the electronic message being opened, and wherein the processor is further configured to generate the live content element as a content automation widget that utilizes an application programing interface to pull content from a data source coupled to the system.

22. The system of claim 20, wherein the recipient-targeted electronic message further comprises a smart content element, which provides content to the electronic message that is determined by a record of community activity, and wherein the processor is further configured to generate the smart content element as a smart block.

23. The system of claim 20, wherein the processor is further configured to generate kinetic content as a kinetic function applied to content of the recipient-targeted electronic message.

\* \* \* \* \*